July 19, 1938.　　　　W. I. CHRISTIAN　　　　2,124,137
AIR CONDITIONING EQUIPMENT
Filed June 17, 1936　　　2 Sheets-Sheet 1
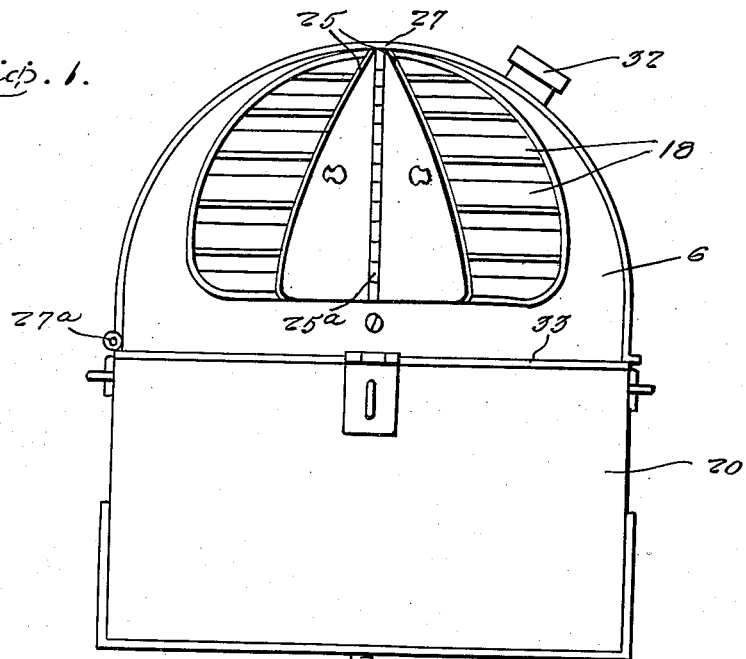
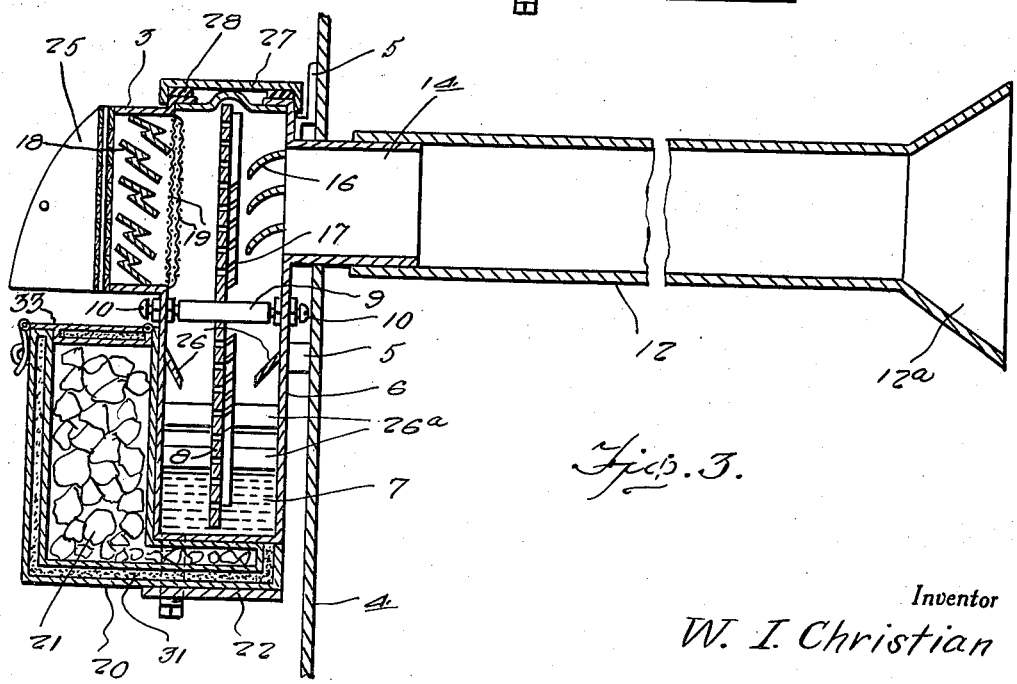
Inventor
W. I. Christian
By Clarence A. O'Brien
Hyman Berman
Attorneys

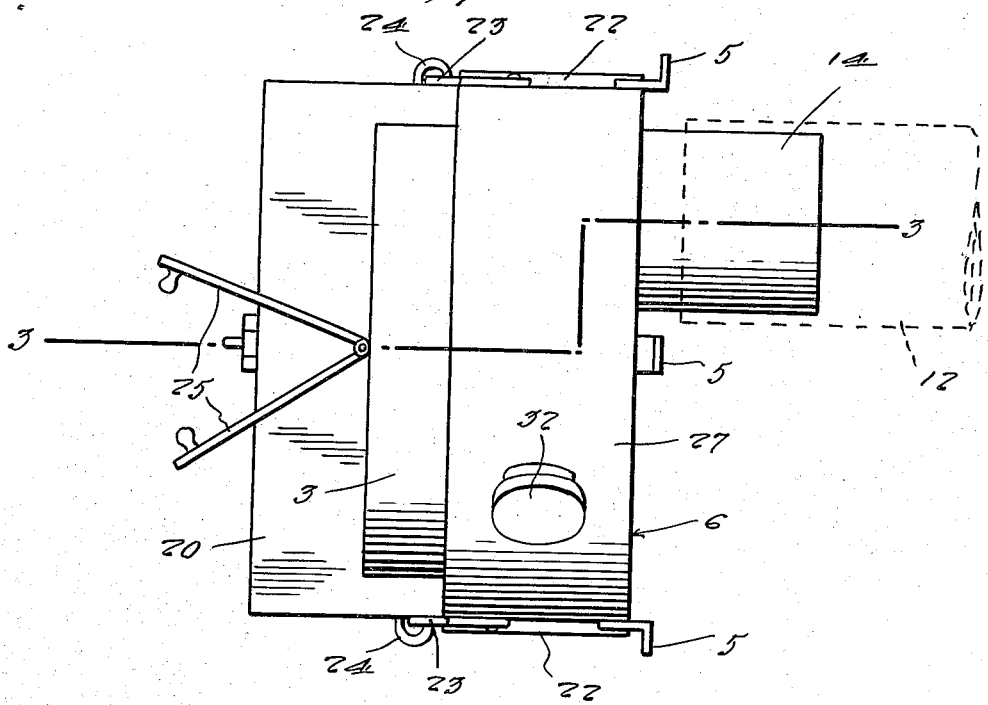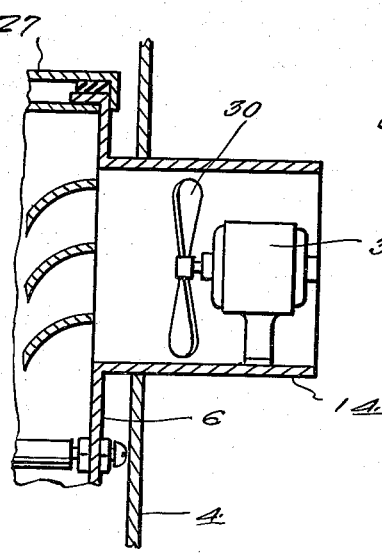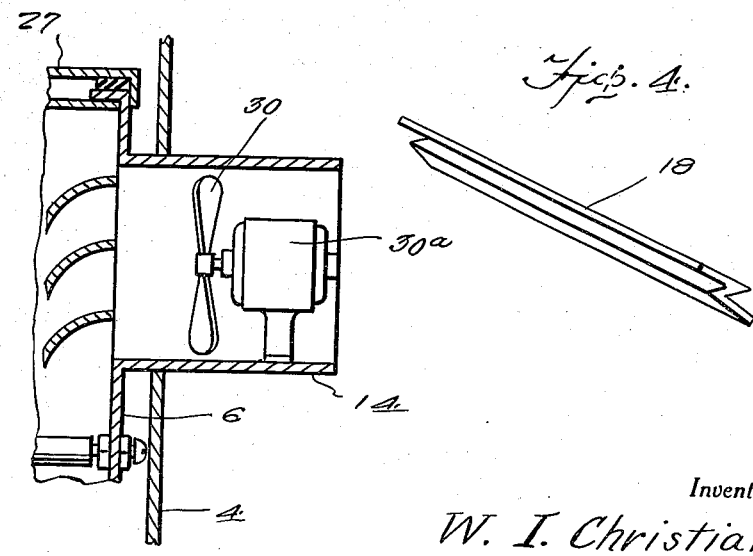

Patented July 19, 1938

2,124,137

UNITED STATES PATENT OFFICE 2,124,137

AIR CONDITIONING EQUIPMENT

Warren I. Christian, Denver, Colo.

Application June 17, 1936, Serial No. 85,804

4 Claims. (Cl. 261—11)

This invention relates to air conditioning equipment and the object of the invention is to provide such equipment particularly designed for use on automobiles, or generally installed wherever air conditioning is desired.

The invention together with its objects and advantages will be best understood from a study of the following description taken in connection with the accompanying drawings wherein:—

Figure 1 is a front elevational view of the equipment.

Figure 2 is a top plan view thereof.

Figure 3 is a vertical sectional view taken substantially on the line 3—3 of Figure 2.

Figure 4 is a perspective view of a baffle member.

Figure 5 is a fragmentary detail sectional view illustrating a slightly modified form of the invention.

Referring to the drawings by reference numerals it will be seen that in the present instance, and in the preferred embodiment thereof the equipment consists of a casing or housing 6, that is water-tight, and has in the bottom thereof to a suitable level water or the like 7.

The casing or housing 6 is adapted to be mounted on the dash or fire-wall 4 of an automobile and to that end is provided with angular brackets 5 through the medium of which and suitable fastening elements the housing or casing 6 is positively secured to the dash or fire-wall 4, or other suitable positions.

The housing 6 is provided with a cover or hood 27 that is hinged at one end as at 27a and a gasket 28 as shown in Figure 3 is provided to produce a water-tight seal between the cover and the casing 6. Any suitable fastening means (not shown) may be provided for securing the cover or lid 27 in closed position.

The casing 6 at the rear thereof has projecting therefrom and through a suitable opening provided therefor in the dash or fire-wall 4 of the automobile an integral intake 14 while at the top and projecting from the front side of the casing 6 is an outlet extension 3 behind which and extending there across are double screens 19 provided for assisting in removing excess moisture from the air issuing through the outlet 3 from the casing 6.

The outlet 3 also has arranged therein a vertical series of substantially Z-shaped baffle plates 18 through which the air after passing through the screens 19 passes to the interior of the car and the baffles 18 serve admirably for removing excess moisture from the air and causing this moisture to drain back into the lower portion of the housing or casing 6.

To control the volume of air discharging into the automobile and also to control the direction of the discharge there are provided at the outer end of the discharge neck or extension 3 of the housing or casing 6 a pair of horizontally swinging doors 25 which are hingedly connected together as at 25a. Obviously by placing the doors 25 at the desired adjustment the volume of air discharging into the automobile may be regulated and also the direction of the discharge easily controlled. The volume of air entering casing 6 through intake 14 can also be controlled by inserting a damper in intake 14 regulated by a lever conveniently located.

The casing 6 internally thereof and at the inner end of the intake 14 is provided with downwardly inclined deflector plates 16 which serve to direct the air entering the casing through the intake 14 against fins 17 that are provided on one side of a rotating disk 8. It will thus be seen that the air entering the casing 6 and striking against the fins 17 will cause the disk 8 to rotate.

Disk 8 is fixed for rotation on a shaft 9 which latter is suitably supported within the casing or housing 6 through the medium of screws 10.

The disk 8 is made of finely perforated sheet metal or other adaptable material, and the lower portion thereof passes through the water 7 and as the disk 8 rotates through the water 7 the apertures therein are filled with water. Thus it will be seen that as air enters the housing 6 it will be forced to pass through the perforations in the disk 8 thereby being thoroughly washed of all dust and impurities, and cooled.

After passing through the perforations in the disk 8, the air passes outwardly of the casing 6 into the interior of the automobile through outlet 3 and as the air passes through the screens 19 and between the baffles 18 excess moisture is removed from the air and drained back into the housing 6.

A substantially L-shaped receptacle for a cooling medium 21 such as chipped ice or solidified $CO_2$ is provided. The receptacle 20 as shown is insulated as at 31 against heat on all sides except that side which is in direct contact with the front and bottom of the casing 6 as shown in Figure 3.

For detachably securing the receptacle 20 in place there is provided a metal stirrup 22 the opposite end portions of which are suitably secured to opposite sides of the lower portion of the casing 6 and the intermediate portion of which is spaced from the bottom of the casing 6 so as to receive the extended lower part of the receptacle 20 in a manner clearly shown in Figures 1 and 3. Also, to assist in securing the receptacle 20 in position there are provided on opposite sides of the casing 6 hooks 23 that engage in suitable eyes 24 provided on opposite sides of the receptacle 20 as will be clear from a study of Figures 1 and 2.

Also, and as clearly shown in Figure 3, receptacle 20 is provided with a hinged cover 33 so that it can be readily cleaned and a fresh supply of cooling medium added when necessary. In this connection it will also be noted that the lid 27 for the housing 6 is provided with a filler cap 32, and an outlet cap is provided in the bottom of casing 6 for draining and cleaning. Casing 6 may also be equipped with water level indicator to show the level of the water in the box and the back wall of casing 6 may be insulated against heat.

Also provided interiorly of the casing 6 and at opposite sides thereof are downwardly inclined fins 26, while additional fins 26a are provided on opposing walls of the casing 6 at right angles to the fins 26, and the fins 26 and 26a are so located as to check excessive splashing of the water and to return the splashed water to the bottom of the casing 6.

From the above it will be seen that with the receptacle 20 held in heat-conducting relationship with chamber 6 the water contents 7 of chamber 6 will be cooled which in turn cools the incoming stream of air. Thus fresh clean air is admitted into the interior of the automobile when the device is in use.

It will be appreciated that any one of several methods or means may be employed for supplying air to the equipment. For example an air duct or tunnel 12 may be employed. Where such a duct or tunnel is employed the same has one end thereof sleeved onto the air intake 14 while at its opposite end the tunnel 12 is provided with a flared intake 12a which is preferably disposed adjacent the radiator and fan of the automobile so that air under pressure will be forced through the tunnel 12 and through the air conditioning equipment to pass into the interior of the automobile in a clean fresh condition. As an alternate instead of the tunnel 12 there may be suitably mounted within the intake 14 a fan 30 driven by a suitable electric motor 30a as shown in Figure 5.

It is thought that the construction, utility and advantages of an invention of this character will be had without a more detailed description.

Having thus described the invention what is claimed as new is:—

1. An air conditioning device of the character described comprising a casing adapted to contain water, said casing being provided adjacent the top thereof and at one side with an air intake, and at a relatively opposite side with an air exhaust, a substantially L-shaped receptacle for a cooling medium disposed against one side and the bottom of said casing in heat-conducting relationship with said casing, said receptacle having a cooling medium therein for cooling the water contents of said casing, and cooperating means on said casing and said receptacle respectively for detachably securing said receptacle to the casing.

2. In an air conditioning apparatus of the character described, a casing having an air intake and an air outlet, and also being provided internally with means for washing, cleaning and cooling air passing through said casing, said casing being adapted to contain water or other adaptable liquid, a substantially L-shaped receptacle adapted to contain a cooling medium, said L-shaped receptacle being against the forward lower edge of the casing disposed with one vertical wall and one horizontal wall thereof in contact respectively with one vertical wall and the bottom wall of said casing, and cooperating means on the casing and the receptacle respectively for detachably securing said receptacle in operative position to said casing.

3. In an air conditioning device of the character described, a casing provided in the upper portion thereof and at one side with an air intake, and at a relatively opposite side with an outlet extension, a perforated water carrier rotatably mounted in said casing, a receptacle for a cooling medium disposed in heat-conducting relationship with said casing, said receptacle having angularly related walls one of which is in contact with a perpendicular wall of the casing and the other of which is in contact with the peripheral wall of the casing, and cooperating means on the casing and the receptacle respectively for detachably securing said receptacle in operative position on said casing.

4. An air conditioning device of the class described comprising a casing adapted to contain liquid in the bottom thereof, a rotatably supported horizontal shaft in the casing above the water level thereof, a vertically arranged perforated disk having a central portion connected with the shaft, an air inlet member connected with the upper portion of one end wall of the casing, to one side of the vertical plane of the shaft, deflector plates extending horizontally across the inner end of said inlet member and curving downwardly and fins attached to that face of the disk which faces the inlet member, said fins receiving the air from the deflector plates, which impart rotary movement to the disk and said casing having an outlet in the upper portion of its opposite end.

WARREN I. CHRISTIAN.